COMPUTER SYSTEM FOR SOLVING MATHEMATICAL EQUATIONS

Filed Feb. 25, 1966 3 Sheets-Sheet 1

INVENTOR.
SOL WEINTRAUB
BY
Millman and Jacobs
ATTORNEYS

COMPUTER SYSTEM FOR SOLVING MATHEMATICAL EQUATIONS

Filed Feb. 25, 1966 3 Sheets-Sheet 2

INVENTOR.
SOL WEINTRAUB
BY
Millman and Jacobs
ATTORNEYS

INVENTOR.
SOL WEINTRAUB
BY
Millman and Jacobs
ATTORNEYS 3,514,757

COMPUTER SYSTEM FOR SOLVING MATHEMATICAL EQUATIONS

Sol Weintraub, 75—19 171st St., Flushing, N.Y. 11366

Filed Feb. 25, 1966, Ser. No. 530,001
Int. Cl. G06f 9/02, 9/06
U.S. Cl. 340—172.5 7 Claims

ABSTRACT OF THE DISCLOSURE

A computer system for mathematical calculations uses a store of incremental values of a variable and a store of corresponding incremental values of a function of that variable. The successive incremental values of each are supplied to separate accumulators until the accumulated value of the variable equals a pre-set input, whereupon the accumulated function value is the desired solution. Inverse calculations are similarly performed.

This invention relates to computers and particularly to computers suitable for solving mathematical equations and for performing various types of computations.

Problems in physics, being in general non-analytic, require various computational algorithms for their solution. Thus, for example, a heat-transfer problem will have its boundary conditions defined in a manner which is in general not suited to an analytic solution of the differential equation and recourse must be made to numerical integration or relaxation methods or other forms of computational aids. Calculations for the diffusion of neutrons in nuclear processes—where analytic methods are for the most part not available—are best solved by utilizing stochastic or Monte-Carlo methods.

Other systems, which are in a sense analytic, such as the matrix representational systems of quantum mechanics, lend themselves to staggering amounts of computation. Electronic digital computers have been a great factor in reducing the computation burden, and often their mere presence induces calculations attempting to solve problems which before their advent were never even under consideration—but for the most part their application consists in following the same computational paths as a research would use wielding pencil and paper, only at a much faster rate, of course. To take a simple example: consider a computer multiplying two Pauli spin matrices; it must in some fashion execute the normal row and column multiplications and additions; the steps for the calculation must be outlined for the computer just as they are for a person using pencil and paper.

Consider now a function of some variable. Present computers must have the algorithm for determining the value of this function programmed, and proceed step by step to the desired solution. For numerous applications the user knows in advance which functions he wishes to evaluate either as a complete solution or only as part of a solution. Thus, if there is some way to immediately obtain the value of the function for a given value of the argument, a great deal of time and effort will be spared.

It is an object of this invention to provide a new and improved computer system for solving mathematical equations.

Another object is to provide a new and improved computer system for evaluating mathematical relationships of various and arbitrary functions of a variable.

Another object is to provide a new and improved functional-argumental computer system.

Another object is to provide a new and improved computer system for performing mathematical calculations.

In accordance with one embodiment of this invention, a computer system is provided for the automatic solution of mathematical equations, the evaluation of arbitrary functions of a variable and other calculations. The system has a storage unit, a processor unit, an output unit, and a control unit that controls the operation of the processor, the storage and the output unit so as to perform sequences of operation on coded digital signals stored in the storage unit, which signals are representative of certain data. The storage unit includes a store of successive incremental values of a variable as well as corresponding incremental values of one or more functions of the variable. The automatic control includes means for extracting from the storage unit the successive incremental value signals of the variable as well as corresponding incremental value signals of the different mathematical functions of the variable. A first means accumulates the successive incremental value signals of the variable and a second means concurrently accumulates the corresponding incremental value signals of the mathematical functions in accordance with a certain mathematical relationship thereof. In addition, a means is responsive to a certain representative value accumulated by the first or second means and is effective to terminate the accumulation of the other means. The signals accumulated in the first means are representative of an argument, and in the second means, of a function. Thereby, starting with a certain value of one, the value of the other can be readily determined.

The foregoing and other objects of this invention, the various features thereof as well as the invention itself may be more fully understood from the following detailed description when read together with the accompanying drawing, in which.

In the drawing, corresponding parts are referenced throughout by similar numerals.

Figure 1:
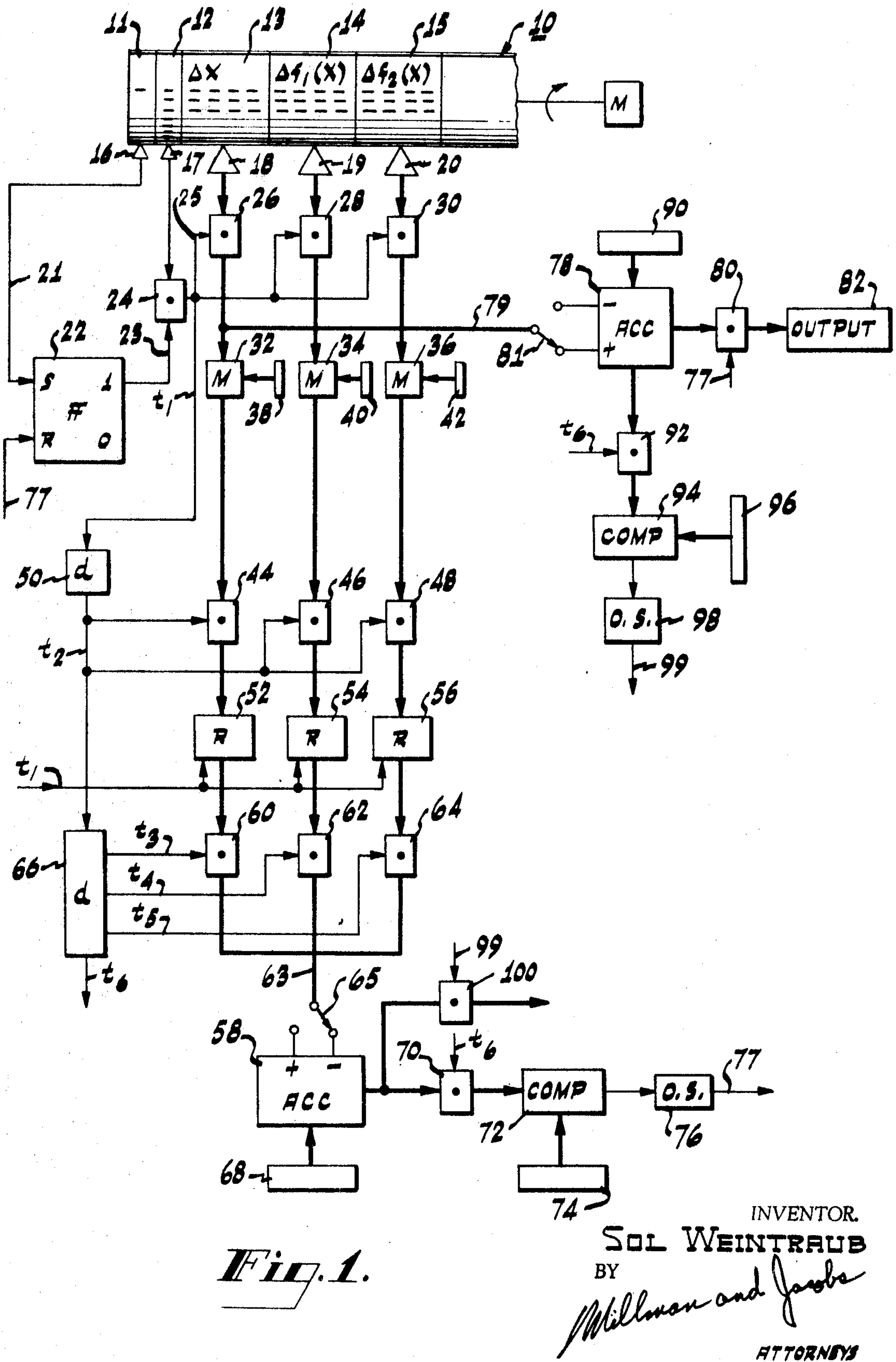
FIG. 1 is a schematic block diagram of a computer system embodying this invention for solving mathematical equations.

In FIG. 1, the computer system includes a cyclic memory illustrated in the form of a continuously rotating magnetic drum 10 driven by a motor M. The drum has a plurality of tracks 11 and 12 and a plurality of bands of tracks 13, 14 and 15 formed around the periphery thereof for the storage of electrical signals that are utilized for various control functions as well as for the storage of data. Any known system for magnetic storage of digital signals may be used. Associated with each track is an individual head and amplifier 16, 17, 18, 19 and 20, which is used for reading signals from its track (and if required for recording, the signals on the track also). The track 11 contains a single timing pulse which establishes an index or zero point on the periphery of the drum, and the head 16 reads that pulse and develops it in a form for setting of flip-flop 22. The flip-flop is a common device in the digital computer art and functions as a bistable device that can be set and reset to opposite states and to provide different control signals at its output corresponding to the states. The output of flip-flop 22, when it is set, is used to enable an AND gate 24 (represented by a square block with a dot inside of it), and the gate 24 passes a series of timing pulses read by head 17 from the timing track 12; these timing pulses correspond to successive storage positions around the periphery of the drum and mark the successive storage locations for data stored in each of the bands of data tracks 13, 14 and 15.

The head 18 represents a plurality of reading heads, one for each of the plurality of tracks of band 13; successive groups of signals representing characters or other data groups are stored in parallel in the tracks at each data position around the drum. Alternatively, if the data is stored completely in series, but a single head 18 is required; various suitable formats for the storage of data on the drum are well known in the art. The head 18 supplies the signals that are read from the data track 13 to a gate 26 (which represents a corresponding plurality of gates 26 where the data is stored in parallel in the tracks, or to a single such gate where it is stored in series). Similarly, heads 19 and 20 read the data signals from bands of tracks 14 and 15 and supply them to gates 28 and 30 (and the heads 19 and 20 and gates 28 and 30 may each take the form of a plurality thereof as explained above). In the drawing, heavy connecting lines represent data transmission lines that may contain a plurality of lines for parallel bits of information; thin connecting lines represent control lines for individual control signals. The gates 26, 28 and 30 are enabled by timing pulses $t-1$ passed by gate 24, so that the passage of signals through these gates is synchronized to the timing pulses appearing in track 12. The outputs of gates 26, 28 and 30 are respectively supplied to individual multipliers 32, 34 and 36, which receive as their second inputs the outputs of individually associated registers 38, 40 and 42. The outputs of gates 26, 28 and 30 correspond to the multiplicand, and the signals supplied by registers 38, 40 and 42 correspond to the multiplier for the multiplication process taking place in the associated multipliers. The registers 38, 40 and 42 may take various forms and one suitable simple form would be a set of manual switches for establishing certain constant multiplier values (corresponding to the coefficients of the terms of mathematical functions and equations), that are used to multiply each incremental value that is read from the drum. All of the data is represented in any suitable digital form including provision for the sign of each mathematical term.

The outputs of multiplier 32, 34 and 36 are respectively passed by gates 44, 46 and 48 (or groups of parallel gates, as required where the data bits are in parallel) under the control of timing pulses $t-2$ (which are formed from the $t-1$ pulses passed by gate 24 and delayed by a delay unit 50 for a time period corresponding to the operating time of the multiplying units). The outputs of the gates 44, 46 and 48 are established in registers 52, 54 and 56 (which are cleared by the $t-1$ pulses just before the enabling of gates 44, 46 and 48). The outputs of the registers 52, 54 and 56 are supplied in sequence to an accumulating register 58 via gates 60, 62 and 64, respectively, which are enabled in sequence by timing pulses $t-3$, $t-4$ and $t-5$, respectively (which are formed by $t-2$ pulses delayed for different appropriate time periods by the delay unit 66). The outputs of gates 60, 62 and 64 are connected to a common line 63 (e.g., via an OR circuit, not shown) and via a selector switch 65, which may be controlled to connect the line 63 to either the decrement (−) or increment (+) input of the accumulator 58. The switch 65 may be an electronic switch or any other suitable control device. The accumulator 58 is preset from a register 68, which may take the form of a set of manually settable switches for initially inserting a desired constant into the accumulator. The output of the accumulator 58 is passed by a gate 70 (enabled by the last timing pulses $t-6$ from delay unit 66) and supplied to a comparator circuit 72 which continuously receives a constant from a register 74 (which may be in the form of a plurality of settable switches) and produces an output when the outputs of gates 70 correspond to the value established by register 74. Alternatively, the comparator 72 may be a simple code recognition circuit for recognizing when the output signals of gate 70 correspond to a certain constant, such as "0" or a negative value. When the desired comparison or output is recognized by circuit 72, a signal therefrom is developed as a pulse by a one-shot multivibrator 76, or any other suitable pulse former, which is supplied to flip-flop 22 to reset that flip-flop.

The data signals from band 13 are also supplied to another accumulating register 78, via gate 26 and line 79 and a switch 81. Accumulator 78 in turn supplies its accumulated result as an output via gate 80 to an output device 82, the gate 80 being enabled by the output of one-shot multivibrator 76. The output device 82 may take any suitable form to provide a visual indication of the result in accumulator 78; suitable forms of output devices are a digital printer which converts the digital signals that it receives to a suitable set of printed characters, a cathode-ray-tube character display, Nixie tube character displays, or other known forms of character display devices for digital signals.

The data bands 13, 14 and 15, each store in successive data positions around the drum the successive incremental values of any desired mathematical function, which initially we may assume is a monotonic increasing function of a certain variable X. The incremental values of the variable itself are stored in band 13, and they may be in the form successive unit values of that variable starting with the same initial value such as "0" at the starting position marked by the index pulse in track 11. For purposes of scaling, this unit incremental value may be any desired value to as many decimal places as is consistent with the sizes of the registers, multipliers and accumulators that are employed, and depending on the desired values of corresponding increments of the functions in data bands 14 and 15. At corresponding positions of the data band 14 are the successive incremental values of a mathematical function $f_1(X)$, such as any desired power of the variable X, the logarithm of that variable, transcendental functions, etc. Merely the increments themselves are stored starting with the value of the function for the stored initial value of X at the initial position represented by the index signal stored in track 11. Thereby, the sum of the increments from the initial position to any rotational position of the band 14 corresponds to the value of $f_1(X)$ for the corresponding value of X determined by summing its increments to that rotational position. Similarly, the data band 15, and as many other bands as are desired, are provided with incremental values of different mathematical functions of that variable X. The computation to establish such tables of incremental values involves merely well known operations; for example, a logarithim table may be employed to obtain the successive increments of the logarithmic function of X for a uniform increment of the variable or for equal log increments, the successive increments of X may be determined. In general, a digital computer may be used to obtain a set of increments for any desired function, and once obtained, the store of increments may be recorded on the drum whenever the function is involved in a required calculation. Such stores of increments may be maintained as a file of endless magnetic tapes, which may be used as the cyclic memory instead of a drum.

In operation, an equation, such as $$X^6+2X^2+7X+19.422=0$$

may be solved in the following manner. The constant term "+19.422" is established in the register 68 by setting the switches thereof and thereby initially is entered into the accumulator 58, and the latter's switch 65 is set to the decrement input. The accumulator 78 is initially preset in a similar fashion to an initial value such as "0" via a similar settable register 90; and its input switch 81 is set to the increment input. Register 74 is set to "0" and to indicate a negative sign value. The band 13 contains successive equal incremental values of X, which may be assumed to be to three decimal places, consistent with the constant term, namely 0.001, and to start with "0." The register 38 is set to contain the coefficient "7" for the X term of the equation. Band 14 contains the successive corresponding incremental values of $X^2$, and register 40 supplies the coefficient "2" for this term. The band 15 contains the corresponding incremental values for the term $X^6$, and the multiplier register 42 contains the coefficient "1" for this term. If there are additional data bands on the drum for other functions of X not involved in this equation to be solved, the associated multiplier registers are set to "0," which disconnects these bands in effect. The coefficient multipliers may be used to provide scaling so as to facilitate the choice of increment ranges that are stored.

Initially, the flip-flop 22 is reset, and a switch (which may be a manual device) maintains the flip-flop in this condition until the computer is set up and ready to operate. The drum 10 is continuously rotating, and after the flip-flop 22 is released for operation, the signal in the indexing track 11 sets flip-flop 22 when the corresponding zero positions of the other tracks 12 to 15 are moving past their corresponding read heads 17 to 20. The setting of flip-flop 22 opens gate 24 to pass the timing pulses $t-1$ from track 12, which in turn open gates 26 to 30 to pass the initial data-value signals stored in the respective data bands. These data values are individually multiplied in their associated multipliers 32, 34 and 36 by the coefficient values established by respective registers 38, 40 or 42, and the products are established in respective registers 52, 54 and 56. Thereafter, successive timing pulses $t-3$, $t-4$ and $t-5$ control the passage of the contents of these registers in succession to the decrement input of accumulator 58 where they decrement the initial constant set in that accumulator by the respective incremental products in the registers. At the same time, the accumulator 78 is incremented by the first value of the variable X stored in band 13. Thereafter, successive increments in band 13 are accumulated in accumulator 78, and the successive increments of all of the data bands 13 to 15 are multiplied and the incremental products are supplied to decrement the accumulator 58. This process continues successively for each increment. Each time accumulator 58 receives the set of values established in the registers 52, 54 and 56, gate 70 is enabled to pass the then established value in accumulator 58 to the comparator 72 which determines whether or not it is equal to or less then zero as determined by the setting of register 74. If the value in accumulator 58 is greater than zero, there is no change in the operation, and the next set of increments are accumulated. When the value established in accumulator 58 is equal to or less than zero, comparator 72 detects this condition and generates a signal that activates one-shot 76 to produce a pulse that resets flip-flop 22. The latter closes gate 24 and thereby gates 26 to 30 to block the passage of any additional increment signals. The pulse from one-shot 76 also opens gate 80 which passes the value of X then accumulated in accumulator 78 to the output device 82 for display, and this value represents a solution of the above equation. The accumulated value of X can be considered a root of the equation, even if it does not make the polynomial identity equal to zero, as long as the difference from zero is some arbitrarily small constant that is consistent with the accuracy of the increment data.

This operation may be repeated to obtain additional solutions within the range of increments of the variable X provided in track 13; that is, by resetting acculator 78 to 0 immediately after the first solution is read out, and continuing the accumulation process without interruption, additional solutions may be obtained in the same fashion. Alternatively, the first root of the equation is divided out to obtain an equation of the next lower degree, and the above process of solution is then repeated, and so on. Negative solutions of the above equations may be obtained by the transformation $Z=-X$ in the equation, and solving for Z in the manner described.

Once the drum 10 is set up with incremental values of the desired functions of X, and the constants are set up in the registers, the time for solving an equation is but a single rotation of the drum. Even where relatively slow speeds are utilized for the drum and for the control circuits, the time required for the actual solution is negligible.

The system of FIG. 1 may also be used to obtain the value of a polynomial (an expression involving two or more functions of the variable) whose terms consist of the functions of the variable X in the data tracks 13 to 15, respectively, and whose coefficients are those established by the register 38, 40 and 42, respectively. For this purpose, the register 90 initially enters a constant into the accumulator 78 corresponding to a particular value of the variable X for which the value of the polynomial is to be determined. The switch 81 of the accumulator 78 is set to the decrement input so as to decrement successive X increments, and the switch 65 of accumulator 58 is set to the increment input to increment successive values of the function. The register 68 initially sets accumulator to "0." The output of accumulator 78 is passed by gate 92 (or an appropriate group thereof) which is enabled by the $t-6$ timing pulse. A comparator 94 compares that output with the setting of a register 96, which may be asseumed to be zero or a representation of a negative value. The output of comparator 94 is supplied to a one-shot multivibrator 98, which enables a gate 100 that receives the outputs from accumulator 58. The output of gate 100 may be supplied to the output device 82 in the manner described above. The output line 99 of one-shot 98 is connected by a switch (not shown) to the reset input of flip-flop 22 in place of line 77.

In operation, the successive values of the terms of the polynomial are incremented in accumulator 58 while the value of the variable X set up in register 90 is decremented in accumulator 78 by successive incremental values of that variable from track 13. When comparator 94 detects that the value of accumulator 78 is equal to zero or less than zero, one-shot 98 is actuated to produce a pulse that opens gate 100 and passes the then established value in accumulator 58 to the output device 82, and this value represents the value of the polynomial at the preset value of the variable X.

The system of FIG. 1, as described above, may be employed to obtain any function value of a variable (or argument) X, and the inverse operation may be performed of obtaining the variable (or argument) given the value of the function. This operation may be performed where the function is the logarithm (e.g., to the base 10), and thereby calculations such as multiplication and division may be readily performed by this invention. The increments of the logarithm of X are stored in the band 14. A first number to be multiplied is established in the accumulator 78 and decremented to zero while the increments of the logarithm of that number are accumulated in accumulator 58, in the manner described above to establish the log of the number. The multipliers 32, 34 and 36 are not needed, and register 40 is set to "1," and registers 38 and 42 are set to "0." Thereafter, a second number to be multiplied is entered in the acculator 78, and its logarithm accumulated in the accumulator 58 and added to the previously established logarithm therein. This operation may be continued for as many numbers to be multiplied as desired. Thereafter, the operation is switched over to decrement the logarithmic values in accumulator 58 and at the same time accumulating increments of the anti-logarithm in accumulator 78. When the accumulator 58 is decremented to zero, the required product is accumulated in accumulator 78, which may then be read to the output device 82 in the manner described above.

Figure 2:
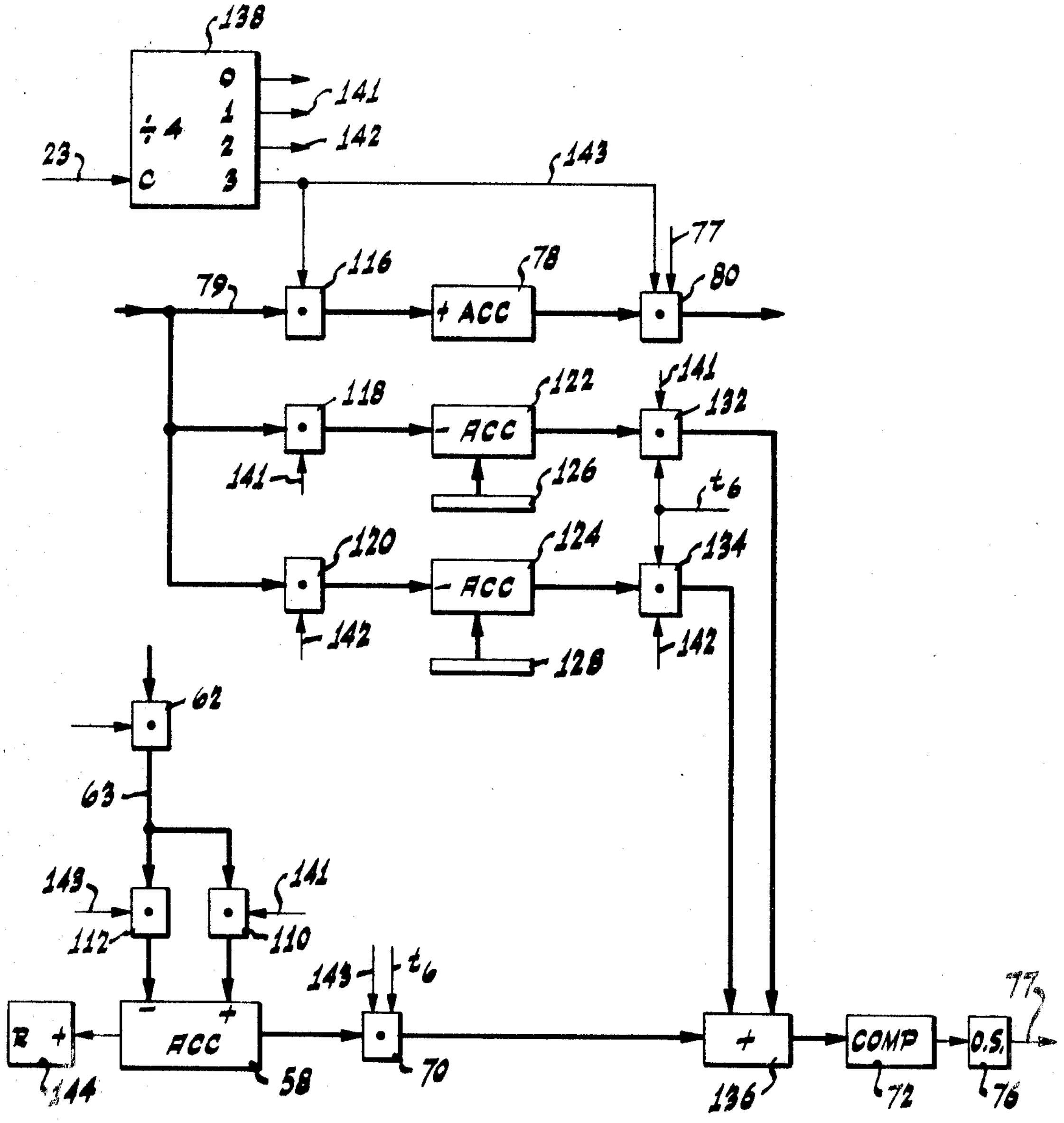
FIG. 2 is a schematic block diagram of a modified form of the system of FIG. 1.

In FIG. 2, an automatic system for multiplication in accordance with this invention is shown in schematic block diagram form. Parts corresponding to those previously described are referenced by the same numerals;

the system of FIG. 2 may be considered as an addition to the system of FIG. 1 for this automatic operation. In the system of FIG. 2, increments of the logarithm of X are read from band 14, in the manner described above, and are supplied via gate 62 and line 63, to the increment and decrement inputs of accumulator 58 via gates 110 and 112, respectively. These gates are enabled by signals on the lines 141 and 143 which are outputs of a counter 138. The increments of X read from band 13 are supplied, via line 79 and gate 116, to the increment input of accumulator 78. The increments of X on line 79 are also fed via two gates, 118 and 120 to two accumulators 122 and 124, respectively, that initially receive the multiplicand and multiplier via input registers 126 and 128, respectively. The comparator 72 receives the outputs of accumulators 122 and 124, via gates 132 and 134, respectively, and the outputs of accumulator 58 passed by agte 70 via mixing circuit or OR gate 136. The counter outputs 141 and 142, respectively, enable gates 118 and 120 and gates 132 and 134; the latter are also opened by the *t*—6 timing pulses. The counter output 143 is used to enable gate 116 and the accumulator output gates 70 and 80. The accumulator 58 has an overflow output connected to a register 144; the register 144 is normally reset to "0," and when the decimal part or mantissa of the logarithm is accumulator 58 overflows to a unit logarithmic value, the latter is transferred to and established in register 144. The latter may be a display register or it may be coupled to the output display 82 by gates in the same manner as accumulator 78.

In operation, the flip-flop 22 is set via line 21 at the initial rotational position of drum 10 by the index pulse in track 11; this action occurs at the beginning of each drum cycle, as described above. When flip-flop 22 is set the resulting step in signal level (e.g., voltage) on line 23 is supplied to the counter 138 to step the latter. The counter 138 is a two-stage binary counter that assumes four different states, corresponding to a normal "0" state and three operating states corresponding to counts of three signal steps on line 23. The input circuit of counter 138 may include a differentiating circuit, or a one-shot multivibrator may be supplied to convert the voltage steps on line 23 to pulses suitable for counting. The signals on the counter output lines 141, 142 and 143 are gate-disabling signals when the counter registers a count other than that corresponding to the output line; these lines carry gate-enabling signals when the counter 138 registers a corresponding count.

For simplicity, the multiplicand and multiplier are initially transformed to scientific notation; that is, the factors are placed in the form of the product of some number and a power of 10, in which the number is greater than or equal to "1." Thereby, by simple addition of the exponents of the 10's, the location of the decimal point in the final product is determined. This exponent sum may be carried by the operator on a scratch pad, or it may be manually registered in register 144 in a suitable fashion.

Initially, accumulators 58 and 78 are reset to "0," and accumulators 122 and 124 are preset to contain the multiplicand and multiplier numbers, respectively. Thereafter, flip-flop 22 is released to respond to the next passage of the index pulse in track 11, which sets the flip-flop to produce a count of "1" in counter 138. Output line 141 enables gates 110, 118 and 141, so that logarithmic increments are accumulated in accumulator 58 and the anti-log increments are decremented in accumulator 122. This operation continues for successive increments, in the manner described above, until accumulator 122 passes through "0." This condition is recognized by comparator 72 and a pulse generated by one-shot 176 is effective to reset flip-flop 22.

Thereafter, at the start of the next drum cycle, flip-flop 22 is again set, counter 138 is stepped to a count of "2," and gates 120, 134 and 110 are enabled (for multiplication, gate 110 is enabled at both a count of "1" and "2," and lines 141 and 142 are connected through an OR circuit to gate 110 for this purpose). The operation described above is repeated, except that accumulator 124 is decremented while accumulator 58 is further incremented by the corresponding logarithmic increments. When accumulator 124 is decremented to "0," this condition is recognized by comparator 72 to reset flip-flop 22. At that time the sum of the two logarithmic accumulations for the multiplicand and multipler is established in accumulator 58. Any overflow of the mantissa is established in register 144.

Upon the start of the third cycle of the drum 10, flip-flop 22 is again set, and counter 138 registers a count of "3." Line 143 enables gates 116 and 112, and enabling signals are also supplied to gates 70 and 80. Successive increments of the anti-log are incremented in accumulator 78, while the successive logarithmic increments are used to decrement the logarithmic value established in accumulator 58. This operation is used in the manner described above until the mantissa in accumulator 58 passes through "0"; the later condition is recognized by comparator 72 to reset flip-flop 22 and open gate 80 to pass the then established anti-log value to the output device 82 in the manner described above. Concurrently, any digit overflow in register 144, which may have occurred during the accumulation of the logarithmic increments, may also be gated to the output device in a similar fashion and used to control the location of the decimal point in the output display in a conventional manner. The counter 138 is reset to a count of "0" at this time, and it may be constructed to be maintained in this condition until manually released to start another cycle of counts.

It will be apparent from the above description that the system of FIG. 2 may be also used to perform the mathematical operation of division; for this purpose, during the second cycle of the drum 10, the gate 112 is enabled by line 142 (instead of gate 110) to decrement the logarithmic increments corresponding to the divisor established in accumulator 124. In other respects the operation is the same, as will be apparent from the above description.

Figure 3:
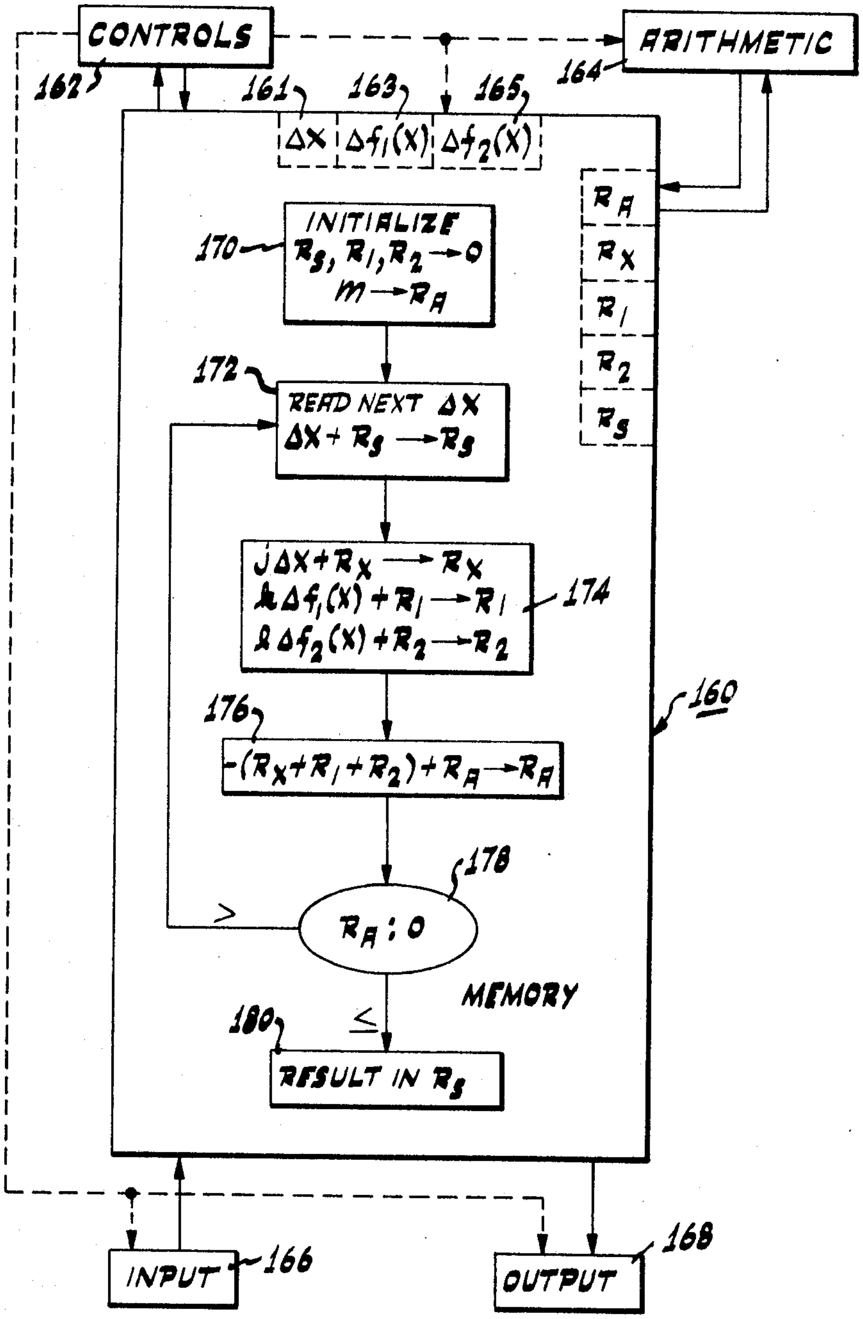
FIG. 3 is a schematic block diagram of a digital computer and of a flow chart of a computer program that simulates the system of FIG. 1 and that embodies this invention.

In FIG. 3 a general-purpose, stored-program digital computer is illustrated, together with a block diagram in flow chart form of a computer program for directing the operation of the computer in accordance with this invention. The computer includes a memory 160, controls 162, a processor or arithmetic unit 164, and input and output devices 166 and 168, respectively. The suitable forms of construction and operation of these units are well known in the art. The interconnection of the various units by solid lines in FIG. 3 represents the flow of data or information between the memory 160 and the other units; the interconnections from the controls 162 to the other units by broken lines represents the flow of control signals that determine the sequences of operations at any time.

The controls 162 are directed by the program stored in the memory 160, which program is represented in conventional flow chart form. Also in the memory 160 are a plurality of working registers $R_A$, $R_X$, $R_S$, $R_1$ and R, and other sections are used to store the various constants of the equations to be solved. Also represented in FIG. 3 are sections of the memory containing stores 161, 163 and 165 of increment signals for X, $f_1(X)$, and $f_2(X)$. These stores are established in associated memory locations so that corresponding increments from each store may be read out together (either concurrently or as required in a particular cycle of the program) in a manner similar to that described above for the increment stores on drum 10.

The computer program illustrated in FIG. 3 in simple form represents the essential elements of the operations to be performed by the machine. It will be apparent to those skilled in the art how to adapt this program for use in various digital computers, or as a section of a more elaborate computer program.

The program is described with respect to obtaining a solution of an equation in the following form:

$$jX+kf_1(X)+1f_2(X)+m=0$$

As represented by the first block 170 of the flow chart, the program calls for initial operations of resetting the registers $R_S$, $R_1$, and $R_2$ to "0," and of establishing the constant "$m$" in register $R_A$, which operates as the function accumulator. Thereafter, as indicated by block 172, the next increment of X is read from the store 161 (which increment is the "0"-value of X on the first pass of the program); corresponding function increments in the stores 163 and 165 are also read for utilization in the succeeding step of the program. A random-access magnetic memory may be used for the incremental stores, and the memory locations of corresponding increments may be appropriately related to read them out concurrently or in seriatim. The increment of X is added to the contents of register $R_s$ and the sum is returned to $R_S$, which operates as the argument accumulator. Thereafter, as indicated by block 174, the increment of X is multiplied by its coefficient, and the product added to the contents of register $R_X$, and the sum returned to $R_X$. Similarly, the corresponding increment from store 163 is multiplied by its coefficient, the product added to the contents of register $R_1$, and the sum returned to $R_1$; and the increment from store 165 is similarly operated on with its coefficient and the contents of register $R_2$.

Thereafter, as represented by block 176, the new contents of registers $R_X$, $R_1$, and $R_2$ are added together and the sum is subtracted from the contents of register $R_A$ and the result returned to $R_A$, whereby the constant "$m$" is decremented. Thereafter, as indicated by test 178, the new contents of $R_A$ are compared with "0"; if the contents are greater than "0," the program returns in a loop to block 172 to repeat the operations represented by clocks 172, 174, 176 and 178 on the next set of increments from the respective stores 161, 163 and 165. The program repeats this loop on successive sets of increments until test 78 indicates that the contents of register $R_A$ are equal to or less than "0." At that time the program steps to block 180, where an appropriate output operation is performed on the result which is then located in $R_S$; that is, the solution of the equation is stored in $R_S$, and this solution may be read out to the output device or utilized in any other desired manner.

This program may be repeated for different sets of coefficients merely by clearing the contents of the registers and changing the contents of the memory stores of the particular coefficients. There is no limit to the variety of mathematical functions that may be handled at any time, subject only to the limitation of memory size of the computer. The incremental stores in the memory may be augmented and readily changed by access to a library of magnetic tapes (represented by input 166) that contain increment stores of all desired mathematical functions.

It will be apparent from the above description that the block diagram of the program illustrated in FIG. 3 directs the carrying out of essentially the same sequence of operations as that carried out by the apparatus of FIG. 1. In fact, the program of FIG. 3, in directing the operation of the digital computer, simulates the system of FIG. 1; the latter includes counterparts of the control unit and stored program in the control logic of the apparatus, and of the processor in the accumulators and comparator. The program illustrated in FIG. 3 corresponds to the apparatus for obtaining the argument when given the value of a function. In a similar fashion, a stored program may be provided for obtaining the value of the function, given the value of the argument, and also similar programs may be readily developed for combining both operations to perform multiplication and division.

Suitable programs for these operations are described in the doctoral thesis of this inventor entitled "On The Development Of An Electronic Functional-Argumental Computer And Its Application To Problems Of Mathematical Physics," available at the Temple University Library. This thesis also sets forth tables of increments for various powers of X, as well as a table of increments for Bessel functions. This thesis and its disclosure is incorporated herein by reference; the thesis also describes how the accumulators may be used for addition and subtraction of numbers to provide a complete computer system.

This invention is not limited to use with any particular mathematical function; for example, it may be used with logarithmic, exponential, trigonometric, transcendental and arbitrary functions, including Bessel, Beta, Gamma, Theta, and Legendre functions. It may also be used for solving elliptical integrals and differential and integral equations. Suitable techniques for handling differentiation and integration are set forth in the aforementioned thesis. Where the functions are both increasing and decreasing in the interval being evaluated, so that the increments are both negative and positive, a procedure may be employed of "normalizing" the increments to be all positive by determining the largest negative increment and using this value as an additional positive increment that is added to all of the function increments in the store, which effectively makes all of the increments positive in nature. In the incrementing and decrementing at the accumulators, this normalizing increment is subtracted with the accumulation of each function increment to obtain the net increment that is required.

It will be apparent that a store of function increments inherently provides a store of the inverse-function increments in the form of the argument increments. Thus, where the store of increments in band 15 (store 165) is for $X^6$, the store of increments in band 13 (store 161) is for the sixth-root of the increments in band 15 by treating the latter as the increments of X. Thus, one can readily perform operations of obtaining roots of any number (and of solving equations involving roots of the variable) merely by using the power increments of the variable in an inverse relation.

Applicant has presented an embodiment of this invention as an illustration thereof. It will be apparent to those skilled in the art that various modifications may be made in the various parts thereof without departing from the essential features of the invention. For example, various known forms of components, logic and circuitry may be used in constructing apparatus embodying this invention and various known programming techniques may be employed in designing specific programs embodying this invention; see, for example, "Handbook of Automation, Computation and Control," vol. 2, by Grabbe et al., 1959. For example, in the system of FIG. 1, instead of initially presetting the accumulators 58 to the value of the constant in an equation, to be solved, the accumulator may be reset to "0" and the register 74 set to the desired constant to be checked by the comparator; the operation and result would otherwise be the same. Therefore, it is intended to be limited only by the scope of the following claims.

What is claimed is:

1. A system for automatically controlling a computer having a memory, a processor, an output unit and control apparatus for controlling the operation of said processor, memory and output unit to perform sequences of operations on coded digital signals stored in said memory and representative of certain data; said system for automatically controlling a computer comprising:

a group of signals representative of successive incremental values of a variable and corresponding incremental values of at least one mathematical function of said variable for storage in said memory; and said control apparatus includes means for directing the operation of said control apparatus so as to process said coded digital signals and to evaluate mathematical relations, said directing means including:

means for extracting from said memory successive incremental signals of said variable starting with certain initial signals and for extracting the corresponding incremental function signals;

first means for accumulating the successive incremental value signals of said variable;

second means for concurrently accumulating the corresponding incremental value signals of said mathematical function in accordance with a certain mathematical relationship; and means responsive to a certain representative value of the signals accumulated by one of said first and second means for terminating the accumulating by the other of said first and second means, so that the representative values of the signals accumulated in said one and other means are related by said mathematical function and by said mathematical relationship employed in said second means.

2. An automatic control system as set forth in claim 1, wherein said responsive means includes means responsive to a certain representative value of signals accumulated by said other means for terminating the accumulating by said one means.

3. An automatic control system as set forth in claim 2, wherein said extracting means includes means for extracting the incremental function signals concurrently with the associated incremental variable signals;

and wherein said second accumulating means includes means for multiplying the incremental function signals by a certain constant.

4. An automatic control system as set forth in claim 3, wherein said memory includes a cyclic magnetic memory and said first and second accumulating means include separate accumulating registers for incrementing and decrementing the incremental signals;

and wherein said responsive means includes a comparator for comparing the accumulated value with a predetermined value and means for controlling the passage of signals read from the magnetic memory.

5. An automatic control system as set forth in claim 4, wherein said accumulating registers each includes means for entering initial values therein.

6. An automatic control system as set forth in claim 4, wherein said directing means further includes means for controlling the accumulating in said second means over successive cycles of said incremental signals, and said responsive means further includes means responsive to different accumulated values in said first means for terminating the accumulating in said second means during successive cycles of said memory.

7. The method of automatically operating computer apparatus to process coded digital signals and to evaluate mathematical relations, said computer apparatus having a memory storing coded digitl signals representative of successive incremental values of a variable and of corresponding incremental values of at least one mathematical function of said variable; said method comprising the steps of:

extracting from the memory of the computer apparatus successive incremental signals of said variable starting with certain initial signals and for extracting the corresponding incremental signals of said mathematical function;

accumulating the successive incremental signals of the variable, and accumulating concurrently the corresponding mathematical-function incremental signals in accordance with a certain mathematical relationship;

and terminating the accumulating of one of said incremental signals upon the accumulation of a certain representative value of the other of said incremental signals, so that the representative values of the two accumulations are related by said mathematical function and by said mathematical relationship.

References Cited

UNITED STATES PATENTS 3,109,090 10/1963 Cabaniss et al. ______ 235—152

RAULFE B. ZACHE, Primary Examiner

U.S. Cl. X.R.

235—156